United States Patent [19]

Agrawal et al.

[11] Patent Number: 5,615,341
[45] Date of Patent: Mar. 25, 1997

[54] SYSTEM AND METHOD FOR MINING GENERALIZED ASSOCIATION RULES IN DATABASES

[75] Inventors: Rakesh Agrawal; Ramakrishnan Srikant, both of San Jose, Calif.

[73] Assignee: International Business Machines Corporation, Armonk, N.Y.

[21] Appl. No.: 436,794

[22] Filed: May 8, 1995

[51] Int. Cl.⁶ .................................................. G06F 19/00
[52] U.S. Cl. ................................................................ 395/210
[58] Field of Search ........................ 364/401 R; 395/214, 395/210

[56] References Cited

U.S. PATENT DOCUMENTS

| | | | |
|---|---|---|---|
| 4,949,256 | 8/1990 | Humble | 364/401 R |
| 5,056,019 | 10/1991 | Schultz et al. | 364/401 R |
| 5,173,851 | 12/1992 | Off et al. | 364/401 R |
| 5,369,571 | 11/1994 | Metts | 364/401 R |
| 5,430,644 | 7/1995 | Deaton et al. | 364/401 R |
| 5,459,306 | 10/1995 | Stein et al. | 235/383 |
| 5,515,270 | 5/1996 | Weinblatt | 235/375 |

OTHER PUBLICATIONS

R. Agrawal et al., "Mining Association Rules Between Sets of Items in Large Databases", Proc. 1993 ACM Sigmod Conf., pp. 207–216, 1993.
R. Agrawal et al., "Fast Algorithms for Mining Association Rules", Proceedings of the 1994 VLDB Conference, pp. 487–499, 1994.
M. Houtsma et al., "Set–Oriented Mining for Association Rules in Relational Databases'", Proc. 11th Conf. on Data Engineering pp. 25–33, 1995.
H. Mannila et al., "Improved Methods for Finding Association Rules", Pub. No. C-1993-65, 20 pages, Univ. Helsinki, 1993.
J.S. Park et al., "An Effective Hash Based Algorithm for Mining Association Rules", Proc. ACM–Sigmond Conf. on Management of Data, San Jose, May, 1994.
R. Agrawal et al., "Fast Algorithms for Mining Association Rules", IBM Research Report RJ9839, 31 pages, Nov. 16, 1994.

*Primary Examiner*—Donald E. McElheny, Jr.
*Attorney, Agent, or Firm*—Baker, Maxham, Jester & Meador

[57] ABSTRACT

A system and method for discovering consumer purchasing tendencies includes a computer-implemented program which identifies consumer transaction itemsets that are stored in a database and which appear in the database a user-defined minimum number of times, referred to as minimum support. The itemsets contain items that are characterized by a hierarchical taxonomy. Then, the system discovers association rules, potentially across different levels of the taxonomy, in the itemsets by comparing the number of times each of the large itemsets appears in the database to the number of times particular subsets of the itemset appear in the database. When the relationship exceeds a predetermined minimum confidence value, the system outputs a generalized association rule which is representative of purchasing tendencies of consumers. The set of generalized association rules can be pruned of uninteresting rules, i.e., association rules which do not occur at a frequency that is significantly different than what is expected based upon the frequency of occurrence of the rule's ancestors.

24 Claims, 10 Drawing Sheets

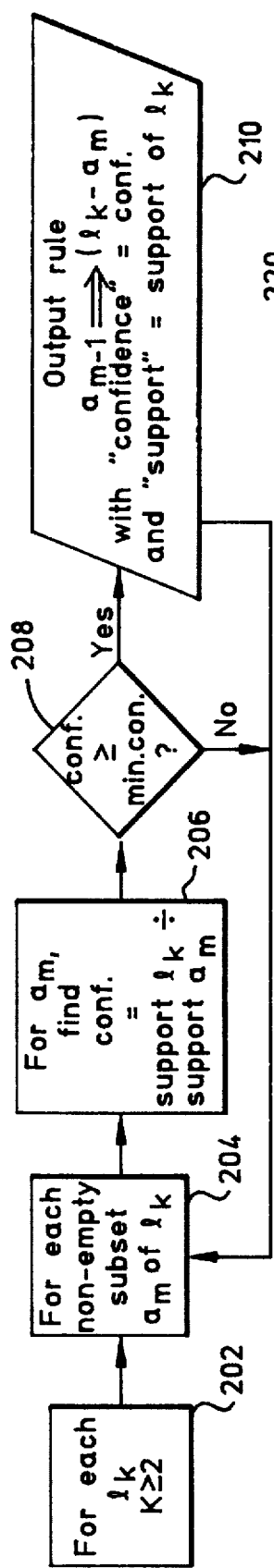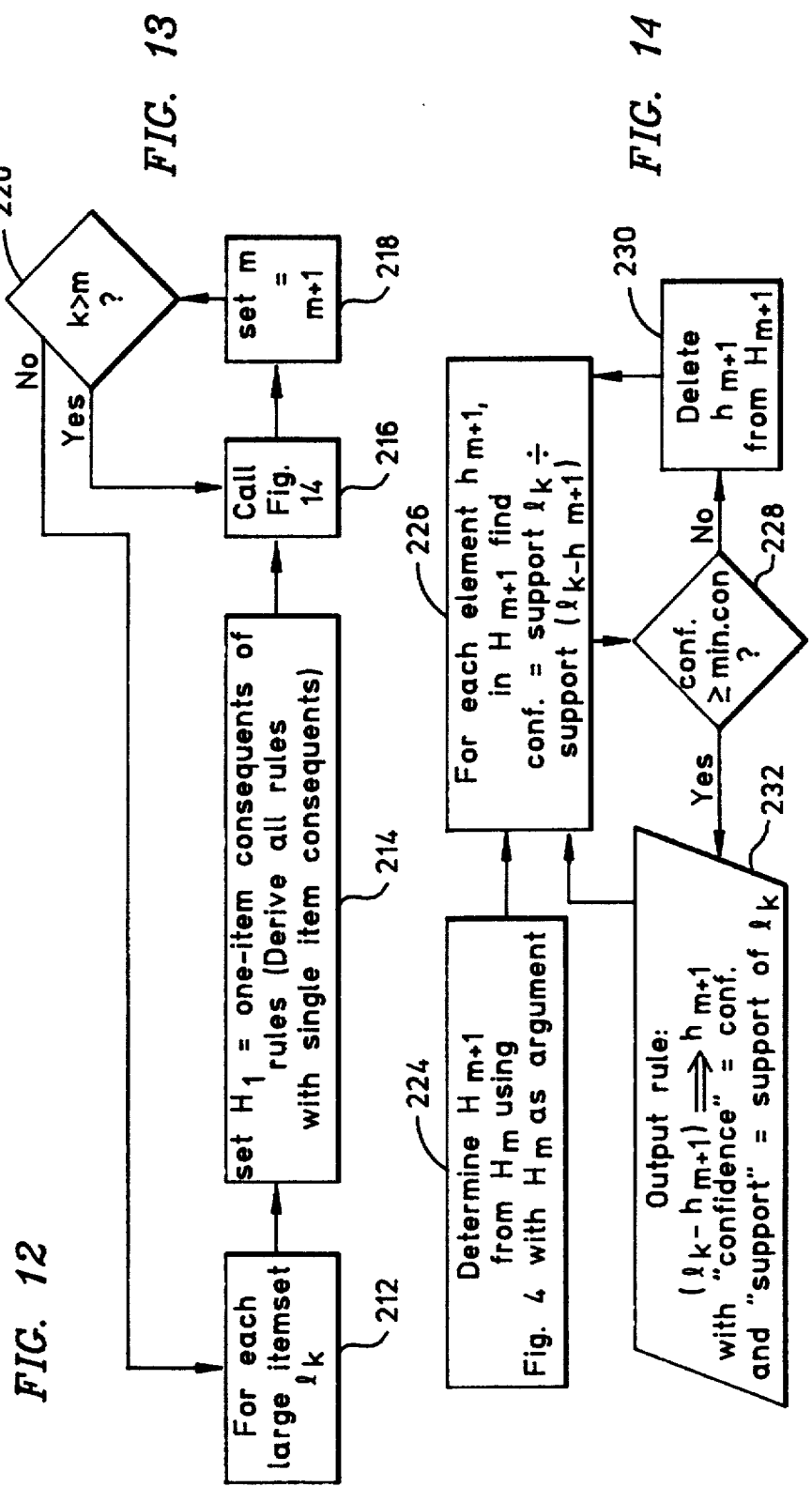

SYSTEM AND METHOD FOR MINING GENERALIZED ASSOCIATION RULES IN DATABASES

CROSS REFERENCE TO RELATED APPLICATIONS

This application contains material related to the following co-pending U.S. patent applications, which are commonly assigned with this application:

U.S. patent application Ser. No. 08/227,428, filed Apr. 14, 1994, for "SYSTEM AND METHOD FOR QUERY OPTIMIZATION USING QUANTILE VALUES OF A LARGE UNORDERED DATA SET";

U.S. patent application Ser. No. 08/398,640, filed Mar. 3, 1995, for "SYSTEM AND METHOD FOR MINING SEQUENTIAL PATTERNS IN A LARGE DATABASE"; and U.S. patent application Ser. No. 08/415,006, filed Mar. 31, 1995, for "SYSTEM AND METHOD FOR QUICKLY MINING ASSOCIATION RULES IN A DATABASE".

The above-referenced U.S. patent applications Ser. Nos. 08/398,640 and 08/415,006, are incorporated herein by reference.

BACKGROUND OF THE INVENTION

1. Field of the Invention

The present invention relates generally to data processing, and more particularly to "computer database mining" in which generalized association rules between significant transactions that are recorded in a database are discovered. In particular, the invention concerns mining a large database of sales transactions.

2. Description of the Related Art

Customer purchasing habits can provide invaluable marketing information for a wide variety of applications. For example, retailers can create more effective store displays and more effectively control inventory than otherwise would be possible if they know that, given a consumer's purchase of a first set of items, the same consumer can be expected, with some degree of probability, to purchase a particular second set of items along with the first set. In other words, it would be helpful from a marketing standpoint to know association rules between itemsets in a transaction. To illustrate, it would be helpful for a retailer of automotive parts and supplies to be aware of an association rule expressing the fact that 90% of the consumers who purchase automobile batteries and battery cables also purchase battery post brushes and battery post cleanser (referred to as the "consequent" in the terminology of the present invention).

It will be appreciated that advertisers too can benefit from a thorough knowledge of such consumer purchasing tendencies. Still further, catalogue companies can conduct more effective mass mailings if they know the tendencies of consumers to purchase particular sets of items with other sets of items. It is to be understood, however, that although this discussion focusses on the marketing applications of the present invention, database mining and, hence, the principles of the present invention, are useful in many other areas, e.g., business and science.

It happens that until recently, building large, detailed databases that could chronicle thousands, and from a statistical view preferably millions, of consumer transactions, much less deriving useful information from the databases (i.e., mining the databases), was highly impractical. Consequently, marketing and advertising strategies have been based upon anecdotal evidence of purchasing habits, if any at all, and thus have been susceptible to inefficiencies in consumer targeting that have been difficult if not impossible to overcome.

With the advent of modern technology, however, building large databases of consumer transactions has become possible. The ubiquitous bar-code reader can almost instantaneously read so-called basket data, i.e., when a particular item from a particular lot was purchased by a consumer, how many items the consumer purchased, and so on, for automatic electronic storage of the basket data. Further, when the purchase is made with, for example, a credit card, the identity of the purchaser can be almost instantaneously known, recorded, and stored along with the basket data. Still further, vastly improved data storage media have made it possible to electronically store vast amounts of such information for future use.

As alluded to above, however, building a transaction database is only part of the marketing challenge. Another important part is the mining of the database for useful information. Such database mining becomes increasingly problematic as the size of databases expands into the gigabyte and indeed the terabyte range.

Not surprisingly, purchasing tendencies, and, hence, particular regimes of database mining, can be classified many ways. In the above-referenced U.S. patent application Ser. No. 08/415,006, for "SYSTEM AND METHOD FOR QUICKLY MINING ASSOCIATION RULES IN A DATABASE", for example, an effective system is disclosed for quickly mining association rules that indicate purchasing habits during single transactions, i.e., rules that indicate, with user-defined degrees of confidence, which frequently-recurring itemsets are likely to purchased along with other frequently-recurring itemsets in a transaction. In accordance with the present invention, an itemset "frequently occurs" in a database and is referred to as being "large" if it appears in the database with at least a user-defined regularity, referred to herein as "minimum support".

Previous database mining systems, however, including the invention disclosed in the parent application, do not consider mining association rules across different levels of a taxonomy, but instead restricted the items in the mined rules to leaf nodes in databases. Thus, for example, in the case of an itemset taxonomy in which the item "jacket" hierarchicly depends from the item "outerwear", which hierarchicly depends from the item "clothes", the parent invention might generate an association rule that indicates that people who purchase jackets tend to purchase hiking boots at the same time, but it is unable to generate more generalized rules that, e.g., people who purchase outerwear or clothing tend to purchase hiking boots. And, because the support for an item in a taxonomy is not necessarily equal to the sum of the supports of its children, rules cannot be inferred for items at higher levels of taxonomies from rules for items at leaves.

Unfortunately, when association rules are restricted to just the leaves of a taxonomy, many significant associations might escape detection. For example, few consumers might purchase hiking boots with jackets, but many people might perhaps purchase hiking boots with outerwear in general, without previous mining systems so discovering. Moreover, a rule stating that consumers who purchase jackets tend to purchase hiking boots might be discovered by the parent invention, but it can happen that such a rule is not nearly as interesting, from a marketing standpoint, as the fact that consumers who purchase outerwear in general tend to purchase hiking boots. Consequently, by not considering taxonomies, previous systems are unable to prune out non-interesting and redundant rules. It is therefore the focus of the present invention to consider taxonomies and thereby discover generalized association rules which also satisfy; a user-defined interest criterium.

Accordingly, it is an object of the present invention to provide a system and method for mining large databases to discover generalized association rules. Another object of the present invention is to provide a system and method for discovering generalized association rules in itemsets that are stored in a transaction database, based on an item taxonomy. Still another object of the present invention is to provide a system and method for finding interesting association rules which repeat with a user-defined degree of regularity, which satisfy a user-defined degree of confidence, and which satisfy a user-defined interest criterium. Yet another object of the present invention is to provide a system and method for quickly mining large databases which is easy to use and cost-effective.

SUMMARY OF THE INVENTION

The invention concerns a procedure to identify association rules in itemsets, also referred to as transactions, that are stored in a large database with a taxonomy on the items in the itemsets.

This invention is realized in a critical machine component that causes a digital processing apparatus to perform method steps for identifying association rules in itemsets with a hierarchical taxonomy on items of the itemsets, the taxonomy defining descendant and ancestor relationships between the items. Hereinafter, the machine component is referred to as a "computer program product".

In accordance with the present invention, the method steps include accessing an itemset and entering the itemset into a set of large itemsets when the number of times the itemset is present in a database of transactions establishes a support value that exceeds a predefined minimum support value. Then, for at least some of the itemsets in the set of large itemsets, the number of times selected subsets of the itemsets appear in transactions in the database is determined. An association rule is output when the number of times a selected subset appears in the database bears a predetermined relationship to the number of times the associated itemset appears in the database and thereby satisfies a minimum confidence constraint.

Preferably, the method includes concatenating itemsets in the set of large itemsets in accordance with a predetermined concatenation regime to generate a next set of candidate large itemsets and discarding all candidate large itemsets whose subsets are not large itemsets. Also, each itemset in the next set of candidate large itemsets is compared with the itemsets in the database to determine the number of times the candidate large itemset is present in the database. The method steps include entering a candidate large itemset into a next forward set of large itemsets only when the number of times the candidate large itemset is present in the database is greater than the minimum support value.

In the preferred embodiment, the taxonomy is a directed acyclic graph (DAG) taxonomy, and at least some of the itemsets contain items that are descendant items and ancestor items in the DAG taxonomy. Ancestors of an item are entered into transactions that include the item only when the ancestor appears in one of the itemsets in the next set of candidate large itemsets. Optimally, the method steps include accessing the DAG taxonomy to predetermine the ancestors of each item prior to entering the ancestors into the set of large itemsets, and when an itemset in the next set of candidate large itemsets contains an item and an ancestor of the item, deleting the itemset from the next set of candidate large itemsets. In still a further optimization, the method steps include entering ancestors of an item into transactions that include the item and deleting duplicate item entries from the transactions, prior to determining the number of times the associated itemset is present in the database.

In another preferred embodiment, the taxonomy is derived on the itemsets and is characterized by a hierarchical order of levels. The levels range from highest level to lowest level successively represented by integers 0 through n, and itemsets containing items at level 0 are accessed for entry into the set of large itemsets before itemsets containing items at other levels.

In this so-called "stratify" embodiment, an itemset at level 1 is deleted if the itemset is a descendant of an ancestor itemset in level 0 when the number of times the ancestor itemset is present in the database does not exceed the predefined minimum support value. As envisioned herein, the deleting step is performed before itemsets at level 1 are accessed for entry into the set of large itemsets.

In yet another preferred embodiment, the taxonomy is characterized by a hierarchical order of levels, and the levels range from highest level to lowest level successively represented by integers 0 through n. In this so-called "estimate" embodiment, the method further includes accessing a selected sample portion of the database to estimate candidate large itemsets. Itemsets that are estimated to be large are entered into the next set of candidate large itemsets. Also, itemsets that are not estimated to be large but that have ancestor itemsets all of which are estimated to be large are entered into the next set of candidate large itemsets. In a so-called "estmerge" embodiment, the method steps include determining the number of times descendant itemsets of an itemset that was not estimated to be large are present in the database when the next set of candidate large itemsets is counted.

If desired, association rules generated by the computer program storage device can be pruned of non-interesting rules by determining expected confidence and support values for an association rule based upon the confidence and support of an ancestor of the association rule. The association rule is identified as interesting when the confidence and support values of the association rule exceeds the expected confidence and support values by a predetermined factor.

In another aspect of the present invention, a computer program product is disclosed which is readable by a digital processing apparatus and which tangibly embodies a computer program. The computer program product combines a computer readable medium with program code elements that identify association rules of itemsets of a database, each itemset having more than one item arranged in a taxonomy, so as to discover generalized customer purchasing tendencies.

In this invention, the code elements are embodied in a program stored on the computer readable medium. These code elements access an itemset and enter it into a set of large itemsets when the number of times the itemset is present in the database exceeds a predefined minimum support value. Further, the code elements determine, for at least some of the itemsets in the set of large itemsets, the number of times selected subsets of the itemsets appear in transactions in the database. Additionally, the code elements output an association rule when the number of times a selected subset appears in the database bears a predetermined minimum confidence relationship to the number of times the associated itemset appears in the database, thereby satisfying a minimum confidence constraint.

In yet another aspect, a program storage device is readable by a digital processing apparatus and tangibly embodies a program of instructions which are executable by the digital processing apparatus. The digital processing apparatus executes the program to perform method steps for identifying generalized association rules of itemsets in transactions stored in a database and having more than one item, the items being characterized by a taxonomic structure, so as to discover customer purchasing tendencies The method steps include identifying as large itemsets those itemsets having items located anywhere in the taxonomic structure and recurring with at least a user-defined minimum support. Further, the method steps include discovering association rules between the large itemsets and subsets thereof when the subset recurrence bears a predetermined relationship to itemset recurrence. Also, the method steps include outputting the association rules as representative of customer purchasing tendencies.

In still another aspect of the present invention, a database mining system is disclosed for discovering association rules in itemsets having items stored in a taxonomically structured database. The mining system includes a large itemset generator for generating large itemsets when the itemsets have a support in a transaction database at least equal to a user-defined minimum support value. Also, the mining system includes an association rule generator for receiving the large itemsets and outputting an association rule when an itemset bears a confidence relationship to at least one of its subsets equal to or greater than a predetermined confidence relationship. Moreover, the system includes a rule pruner for identifying an association rule as interesting when the support and the confidence relationship respectively exceed an expected support and an expected confidence relationship by a preselected factor.

A computer-based system is disclosed in yet another aspect for discovering purchasing tendencies of consumers by identifying association rules between itemsets of transactions and subsets of the itemsets, the subsets including one or more items. The system includes a multilevel taxonomic structure accessible by the computer for storing the items in a hierarchical relationship. A large itemset generator is provided for accessing the taxonomic structure and the transactions for determining a first number of times an itemset appears in the transactions and for designating the itemset as a large itemset when the first number of times exceeds a minimum support value.

An association rule discoverer accesses the large itemset generator for determining a second number of times at least one subset of an itemset appears in the transactions. In accordance with the present invention, the association rule discoverer outputs an association rule that is representative of purchasing tendencies of consumers when the first number of times bears a predetermined minimum confidence relationship to the second number of times.

The details of the present invention, both as to its structure and operation, can best be understood in reference to the accompanying drawings, in which like reference numerals refer to like parts, and in which:

BRIEF DESCRIPTION OF THE PREFERRED EMBODIMENTS

FIG. 12 is a flow chart showing a simple method for determining association rules in large itemsets across a taxonomy;

FIG. 13 is a flow chart showing a comparatively fast method for determining association rules in large itemsets across a taxonomy;

FIG. 14 is a flow chart showing the details of the method shown in FIG. 13; and

DETAILED DESCRIPTION OF THE PREFERRED EMBODIMENTS

Figure 1:
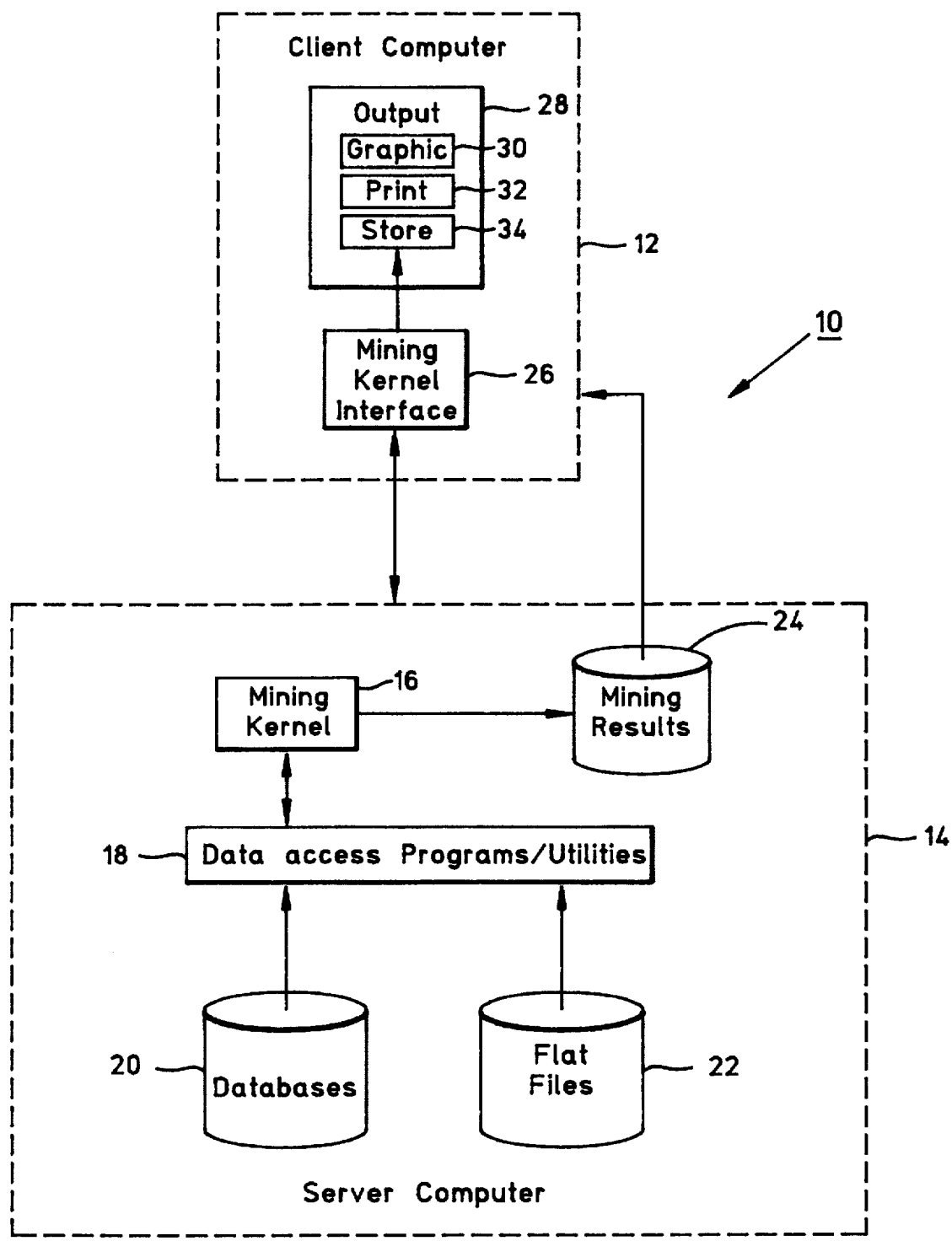
FIG. 1 is a functional block diagram of the system for mining generalized association rules of the present invention.

Referring initially to FIG. 1, a system for mining databases for generalized association rules is shown, generally designated 10. In the particular architecture shown, the system 10 includes one or more digital processing apparatus, such as a client computer 12 and a server computer 14. In one intended embodiment, the server computer 14 may be a mainframe computer made by IBM Corp. of Armonk, N.Y., and use an operating system sold under trademarks such as MVS. Or, the server computer 14 may be a Unix computer, or OS/2 server, or Windows NT server, or IBM RS/6000 250 workstation with 128 MB of main memory running AIX 3.2.5. The server computer 14 may own a database system, such as DB2 or ORACLE, or it may have data on files on some data storage medium such as disk, e.g., a 2 GB SCSI 3.5" drive, or tape. It is to be understood that architectures other than the one shown may be used. For example, the functions of the client computer 12 may be incorporated into the server computer 14, and vice versa.

As shown, the operating system of the server computer 14 includes a mining kernel 16 which may be executed by a processor within the server computer 14 as a series of computer-executable instructions. These instructions may reside, for example, in RAM of the computer 14.

Figure 1A:
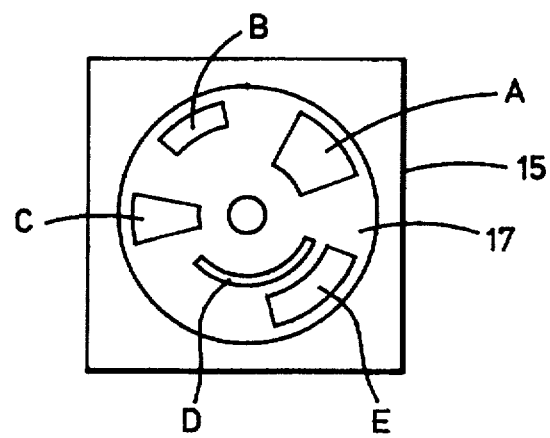
FIG. 1A illustrates a machine component embodying the invention, with portions cut away for illustration.

Alternatively, the instructions may be contained on a data storage device with a computer readable medium, such as a computer diskette 15 shown in FIG. 1A. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ language code.

FIGS. 2–15 illustrate the structure of such instructions as embodied in a computer program. Those skilled in the art will appreciate that FIGS. 2–15 illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 1A as a combination of program code elements A–E in computer readable form that are embodied in a computer-usable data medium 17, on the computer diskette 15. As mentioned above, however, such media can also be found in semiconductor devices, on magnetic tape, and on optical disks.

Each of the code elements A–E is for directing a digital processing apparatus to facilitate some portion of the method by which this invention is practiced. Even when no single code element A–E includes the complete method, two or more of the code elements together may comprise all of the program means necessary to facilitate the practice of the invention.

FIG. 1 shows that, through appropriate data access programs and utilities 18, the mining kernel 16 accesses one or more databases 20 and/or flat files (i.e., text files) 22 which contain data chronicling transactions. After executing the steps described below, the mining kernel outputs association rules it discovers to a mining results repository 24, which can be accessed by the client computer 12.

Additionally, FIG. 1 shows that the client computer 12 can include a mining kernel interface 26 which, like the mining kernel 16, may be implemented in suitable computer code. Among other things, the interface 26 functions as an input mechanism for establishing certain variables, including the minimum support value, minimum confidence value, and interesting factor R defined below. Further, the client computer 12 preferably includes an output module 28 for outputting/displaying the mining results on a graphic display 30, print mechanism 32, or data storage medium 34.

Figure 2:
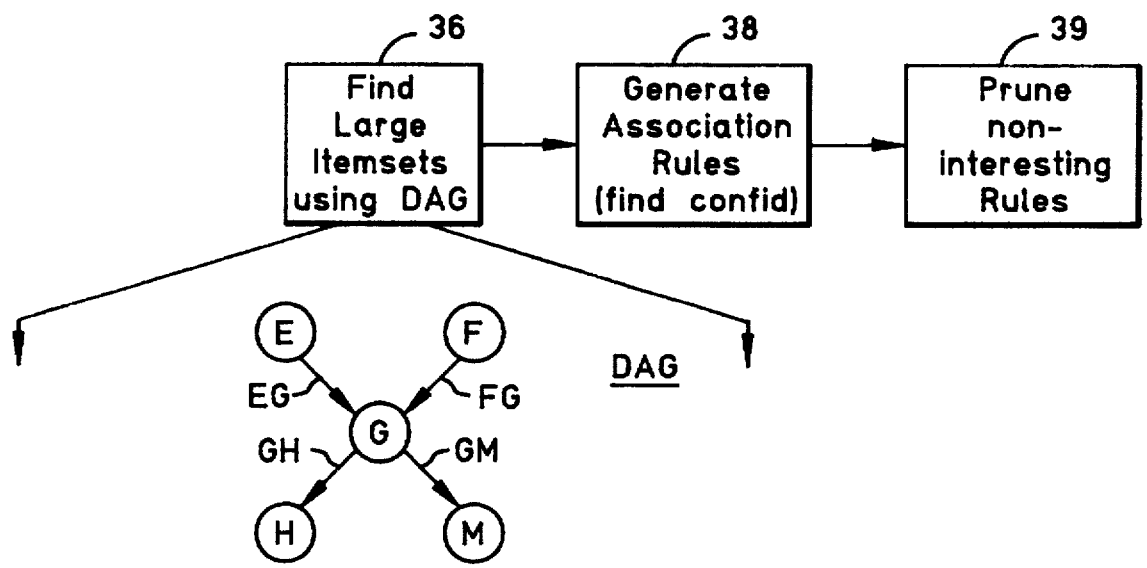
FIG. 2 is a flow chart showing the overall operation of the present invention.

FIG. 2 shows the overall method of the present invention. Beginning with block 36, the system 10 identifies large itemsets in the database 20. Thus, block 36 is essentially a large itemset generator. As more fully disclosed below, by "large itemset" is meant a set of one or more items which are purchased in a user-defined percentage of all transactions in the database 20, i.e., itemsets which appear in the database 20 in a user-defined "minimum support" percentage of transactions. Stated differently, at block 36 the database 20 is accessed for determining a first number of times an itemset appears in the database and for designating the itemset as a large itemset when the first number of times exceeds a minimum support value. In contrast, "small" itemsets are itemsets that do not fulfill the minimum support criteria.

Moreover, as disclosed below the items contained in the itemsets of transactions that are stored in the database 20 are characterized by a hierarchical taxonomy. Thus, as defined by the taxonomy some items are ancestors (also herein referred to as "parents") of other items, i.e., some items are located at higher levels of the taxonomy than other items which are located at lower levels and lie in a path from the ancestor item. Such items located at lower levels of the taxonomy are said to be descendant items of the higher level items in the taxonomy from which the lower level items branch. As used, herein, a first itemset is an ancestor to a second itemset if the first itemset contains an item that is an ancestor of an item contained in the second, itemset. Accordingly, by "large itemset" is further meant such an ancestor itemset that satisfies the minimum support constraint by virtue of the number of times its descendant itemsets appear in the aggregate in the database 20.

In other words, the items that appear in transaction itemsets in the database 20 are characterized by a taxonomical structure, i.e., a data structure wherein stored elements are arranged in one or more hierarchical taxonomies. For example, the items in the database 20 can be characterized by a taxonomical structure by item type category. Also, the items in the database 20 can be characterized by a taxonomical structure by item cost category. When multiple taxonomies are present, they may be combined in a directed acyclic graph (DAG) taxonomic structure, such as the structure schematically shown in FIG. 2.

The taxonomic structure of the present invention can be better understood in reference to the following example. Entry "E" could be, e.g., "clothes", representing an interior node of a taxonomy based upon item type. Entry "F", in contrast, could be, e.g., "articles costing less than $10", representing an interior node of a taxonomy based upon item cost. Both entries "E" and "F" are said to be at the highest level, termed herein zero level, of the DAG structure shown.

Then, entry "G" could be "socks", indicating an entry in the level immediately below the zero level ("level one") in both taxonomies. As indicated by DAG edges EG and FG, entry G descends from both entries "E" and "F".

Entries "H" and "M" could be "athletic socks" and "children's socks", respectively, indicating entries at level two of the DAG which, as respectively indicated by DAG edges GH and GM descend from entry "G" and, hence, from entries "E" and "F". In accordance with the present invention, entries "E" and "F" are close ancestors of entry "G" and ancestors of entries "H" and "M", but because the DAG is directed, the converse is not true in a DAG structure ("E" and "F" do not descend from "G", and "G" does not descend from "H" and "M"). Entry "G" is a descendant of entries "E" and "F", and entries "H" and "M" are descendants of entry "G" and, hence, are descendants of entries "E" and "F". Typically, only items at the lowest, or leaf level of the taxonomy will recorded in transactions. Support in the database 20 for items at higher levels of the taxonomy is determined from the support of the corresponding descendant items at the leaf level.

After the large itemsets have been identified at block 36, the process moves to block 38. In accordance with the invention disclosed in detail below, block 38 is an association rule discoverer which accesses the large itemset generator established by block 36 for determining a second number of times at least one subset of an itemset appears in the database 20. Then, the association rule discoverer at block 38 outputs an association rule representative of purchasing tendencies of consumers when the first number of times bears a predetermined relationship to the second number of times, i.e., when a predetermined or user specified minimum confidence value is satisfied.

As intended by the present invention, the association rule generator outputs generalized association rules that can span levels in the DAG, and that have the form $X \Rightarrow Y$, wherein X, Y are itemsets, $X \cap Y = \Phi$, (i.e., $X \cap Y$ is null), no item in Y is an ancestor to any item in X, and X, Y can contain items from any level in the taxonomy.

As an example, the present invention might access a database which chronicles transactions in an automobile parts, supplies, and service center. An association rule that can be discovered by the present invention might be that 98% of all customers who purchase tires along with tire pressure gages also purchase wheel balancing services during the transaction. Stated differently, in the example given it can be said with a 98% confidence level that wheel balancing services are not purchased separately from tires and tire pressure gages. As recognized by the present invention, the implications of association rules which are discovered between itemsets can produce substantial economic value to retailers, advertisers, marketing executives and indeed in a wide variety of applications.

At block 39, certain association rules discovered at block 38 might be pruned, on the basis that such rules might not be interesting. Stated differently, block 39 is a rule pruner for identifying an association rule as interesting when the support and the confidence relationships determined at blocks 36 and 38 respectively exceed an expected support and an expected confidence relationship multiplied by a preselected factor R. As more fully described below, the expected support and confidence of each rule is determined based upon the support and confidence of close ancestors, if any, of the rule.

Accordingly, any rule that has no ancestors is interesting, and any rule that has a close ancestor but for which the actual support and confidence of the rule fall outside a user-defined expected boundary that is based upon the ancestor is interesting. In contrast, any rule that has a close ancestor and for which the actual support and confidence of the rule fall within a user-defined expected boundary that is based upon the ancestor is not interesting.

The present invention recognizes that it need consider only close ancestors of rules when determining whether a test rule is interesting. More particularly, for a test rule to be truly interesting, it must be interesting with respect to its closest ancestor. If a test rule is otherwise interesting with respect to a relatively distant ancestor, but not a relatively closer ancestor to the test rule, it is actually the closer ancestor that is interesting with respect to the distant ancestor, and the test rule actually is not interesting in and of itself.

Figure 3:
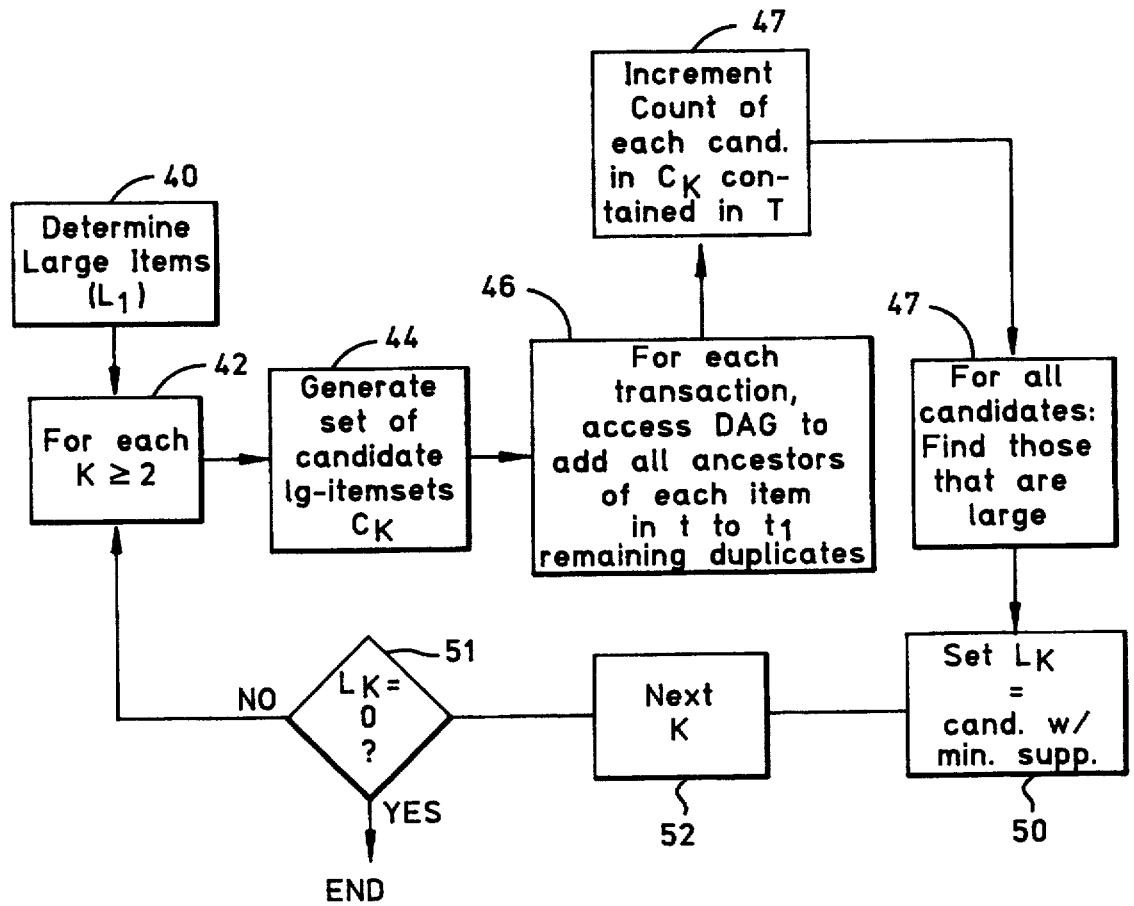
FIG. 3 is a flow chart showing the operation of the Basic embodiment of the present invention in identifying large itemsets.

FIG. 3 shows one embodiment of the process of the large itemset generator established by block 36 in FIG. 2, referred to herein as "Basic". In contrast to the present invention, the prior procedures mentioned above generate and count candidate large sequences only by considering items at leaf nodes in a database, i.e., by not considering that useful association rules might span various levels in a taxonomy. FIG. 3 shows a novel modification to account for taxonomies in the Apriori method disclosed in the above-referenced parent application. It is to be understood that other previous methods can be so modified. e.g., the AprioriAll and the hybrid methods disclosed in the above-referenced parent application.

Recall that "large itemsets" means itemsets which appear in the database with a user-defined regularity, termed herein as "minimum support". For example, the user may want to know what itemsets appear in at least 25% of the customer transactions in the database. The minimum support value in this instance is 25%, and by counting the number of transactions in which the itemset appears and then dividing by the total number of transactions, it may be determined whether the itemset meets the minimum support criterion.

At block 40, the mining kernel 16 embodied by the mining kernel 16 embodied by the system 10 identifies the set $L_1$ of large single-item itemsets in the database 20. To determine whether a single item itemset is large, all items in the database 20 are initially counted by passing over the database 20, and their support determined as described above. The following publications, all of which are incorporated herein by reference, disclose specific methods for finding large itemsets: Agrawal et al., "Mining Association Rules Between Sets of Items in Large Databases", *Proc. of the ACM SigMod Conference on Management of Data*. Washington, D.C. 1993; Agrawal et al., "Fast Algorithms for Mining Association Rules in Large Databases", *Proc. of the VLDB Conference*, Santiago, Chile 1994; Houtsma et al., "Set-Oriented Mining of Association Rules", *IBM Research Report RJ* 9567, October, 1993; and Mannila et al., "Efficient Algorithums for Discovering Association Rules", *KDD-94:AAAI Workshop on Knowledge Discovery in Databases*, July 1994.

Next, at block 42, the mining kernel 16 embodied by the system 10 enters an iterative process for each $k \geq 2$. At block 44, as disclosed in greater detail below in reference to FIG. 4, a seed set of large itemsets $L_{k-1}$ having a length (i.e., number of itemsets) equal to "k-1" (initially consisting of the set of large itemsets disclosed above, wherein k=2) is used for generating a set of candidate large itemsets $C_k$ having length k.

Then, at block 46 for each transaction in the database the method accesses the taxonomy of the present invention (e.g., the DAG shown in FIG. 2) to add all ancestors of each item in the transaction to the transaction, removing any duplicate entries. Consequently, the set $C_k$ of candidate large itemsets can contain items at leaf nodes in the taxonomy, as well as their ancestors. At block 47, the method increments the count of each candidate in the set of candidate large itemsets $C_k$ found in the transaction.

At block 48, the support for the candidate large itemsets is determined by passing over the database to count the number of times each candidate large itemset appears therein, and then determining whether the number of times equals the minimum support value defined by the user. The support for candidate large itemsets that are ancestors of transactions in the database is determined by implication by noting the support of its descendants.

At block 50, a forward set $L_k$ of actual large itemsets is set equal to the set of candidate large itemsets found at block 48 to have minimum support. This forward set $L_k$ of actual large itemsets becomes the seed for the next iteration at block 52. From block 52, the mining kernel 16 embodied by the system 10 returns to block 42. When $L_k$ is empty, the process terminates. This decision is shown in block 51.

Figure 4:
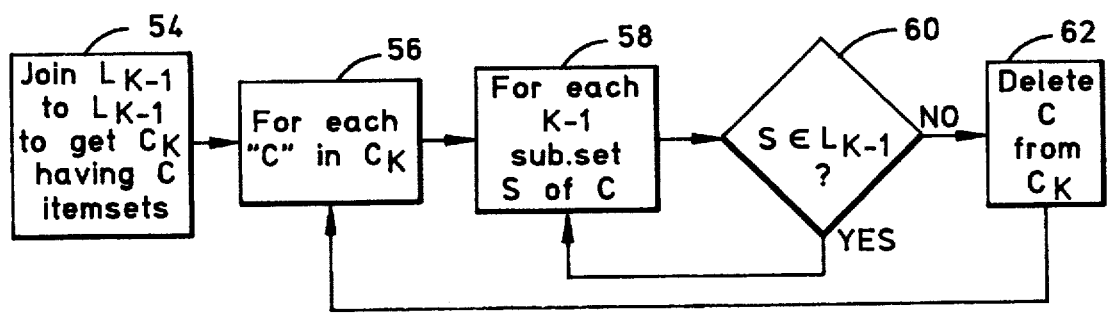
FIG. 4 is a flow chart showing the candidate generation of the present invention.

FIG. 4 shows the details of the present invention in creating sets of candidate large itemsets. At block 54, $L_{k-1}$ is concatenated (i.e., joined) to itself to create an initial $C_k$ having of $L_{k-1}$ are joined to each of the other itemsets, designated $q.litemset_1$, $q.litemset_2$ ... $q.litemset_{k-1}$ c itemsets. More particularly, the itemsets, designated as $p.litemset_1$, $p.litemset_2$ ... $q.litemset_{k-1}$ in $L_{k-1}$ to yield a set $C_k$ of candidate large itemsets c, each c having k itemsets, with the constraint that no itemset c in $C_k$ is repeated.

Next, the mining kernel 16 embodied by the system 10 prunes candidate itemsets c from $C_k$ which contain any subitemsets not found in $L_{k-1}$. The mining kernel 16 embodied by the system 10 considers, at block 56, each customer itemset c in the set of candidate large itemsets $C_k$ as described below, and then proceeds to block 58 for each subitemset s having k-1 itemsets of the customer itemset c.

Starting with the initial candidate itemset c in the set of candidate large itemsets $C_k$, and with the initial subitemset s of c having k-1 itemsets at decision block 60, the mining kernel 16 embodied by the system 10 determines whether s is an element of the immediately preceding set of actual large itemsets $L_{k-1}$. As intended by the present invention, the set of large itemsets is used as the seed for the first iteration.

If s is an element of the immediately preceding set of actual large itemsets $L_{k-1}$, the mining kernel 16 embodied by the system 10 moves back to block 58 to retrieve the next subitemset s in $C_k$. Otherwise, the mining kernel 16 embodied by the system 10 proceeds to block 62 to delete, i.e., prune, c from $C_k$, and then the mining kernel 16 embodied by the system 10 returns to block 56 to test the next itemset c in $C_k$. As intended by the present invention, the immediately preceding set $C_k$ of candidate large itemsets may be used in lieu of the immediately preceding set of actual large itemsets $L_{k-1}$ to generate the set $C_k$ of candidate large itemsets.

Figure 5:
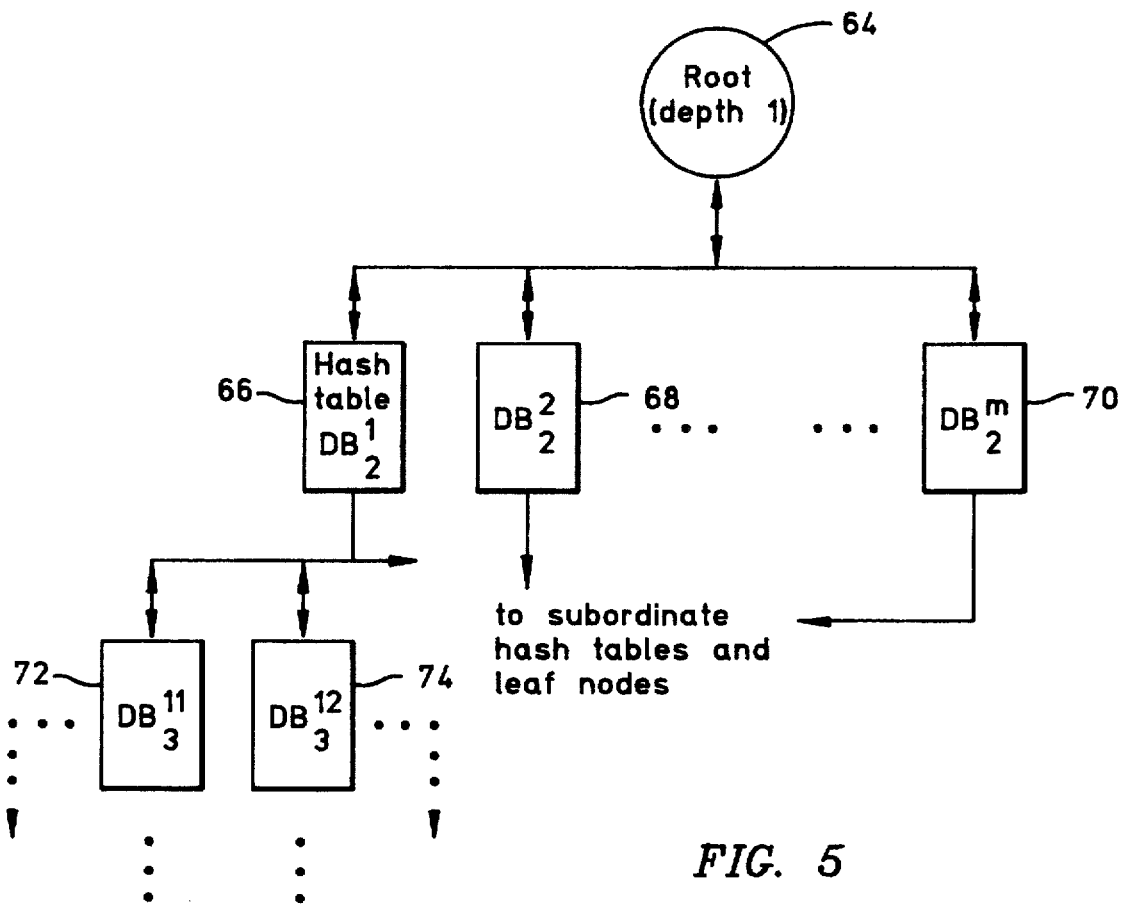
FIG. 5 is a schematic diagram showing the data structure used by the Basic embodiment.
Figure 6:
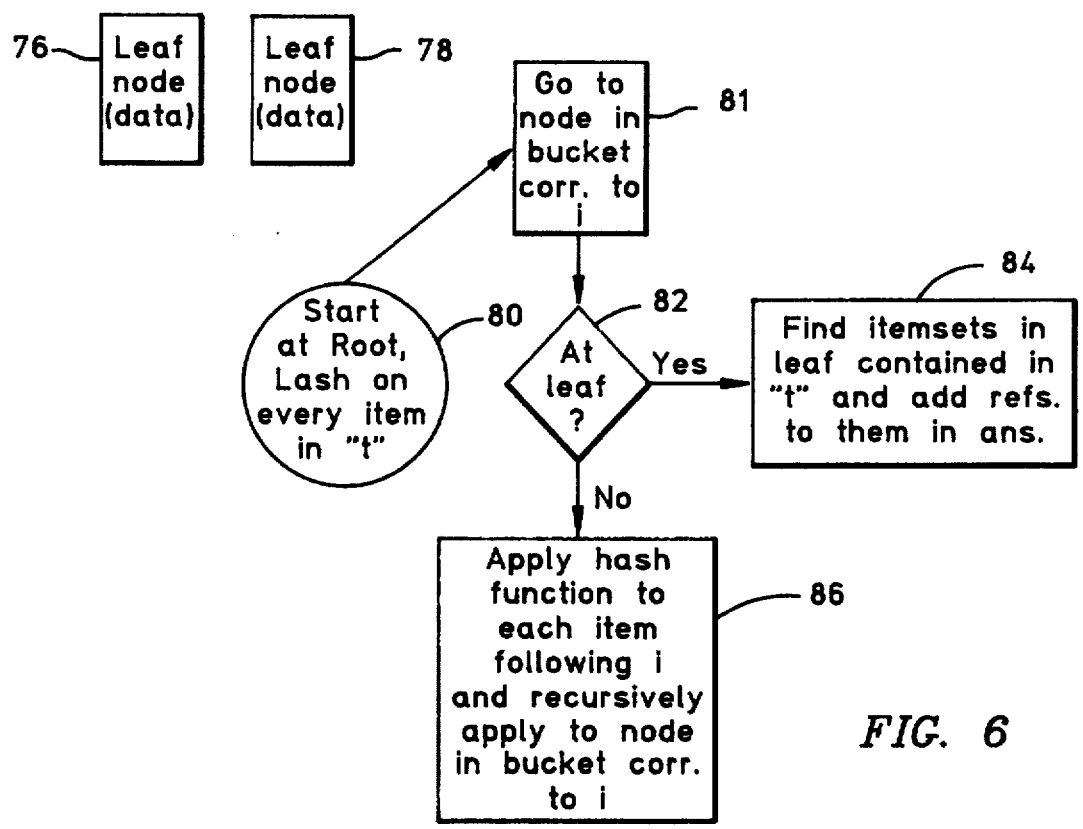
FIG. 6 is a flow chart showing the data management of the Basic embodiment.
Figure 7:
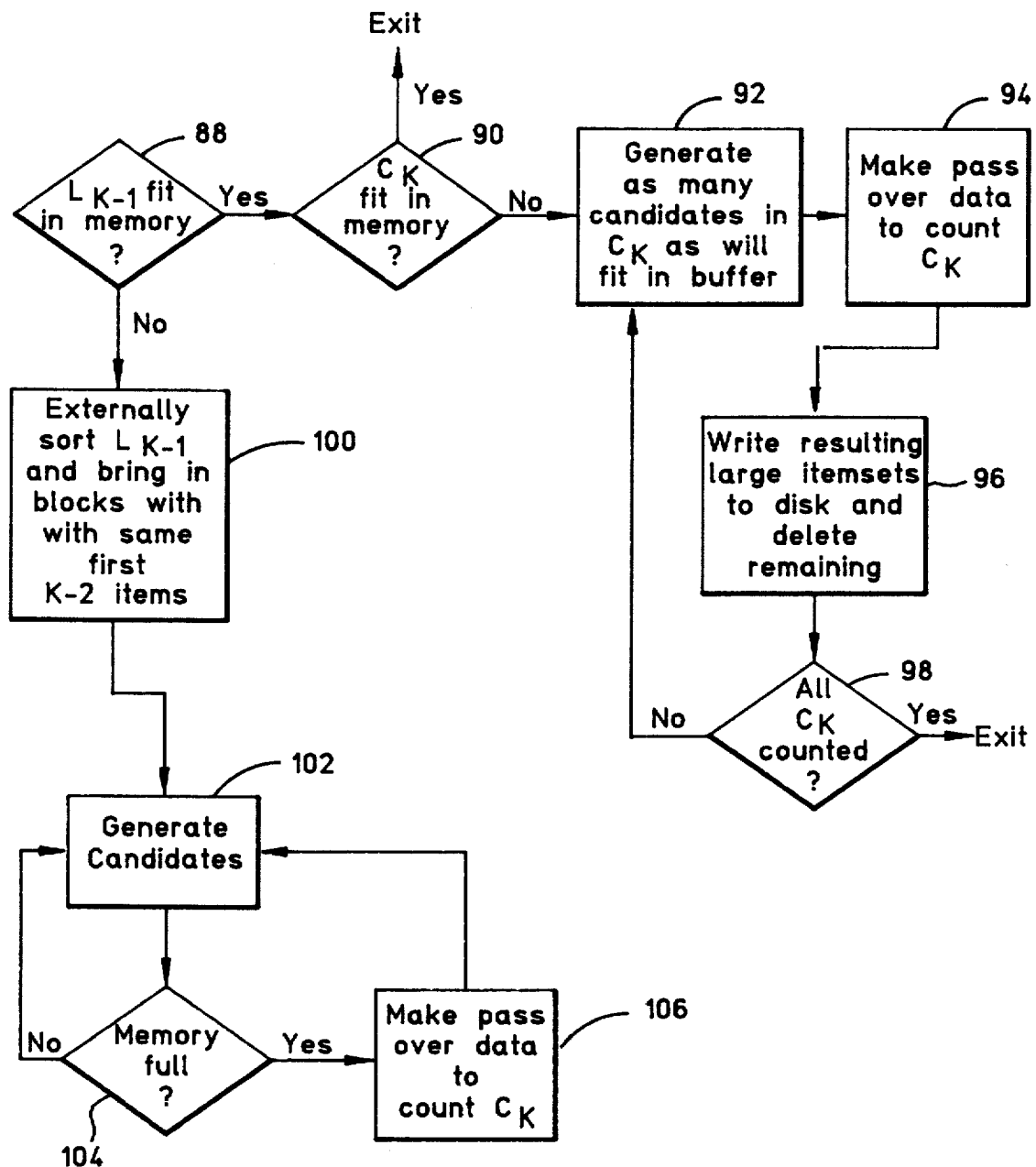
FIG. 7 is a flow chart showing the buffer management of the Basic embodiment.

In very large databases, e.g., databases in the gigabyte and indeed terabyte range, database management and data buffer management can present challenges. FIGS. 5 and 6 how the present invention addresses database management, and FIG. 7 shows how the present invention addresses data buffer management.

As can be appreciated in reference to FIG. 5, once a set $C_k$ of candidate large itemsets is generated, data contained in the set $C_k$ of candidate large itemsets is preferably arranged in a data structure organized to permit rapid searching such as a dynamic hash-tree. Such a data structure includes a root 64 that is at a depth, i.e., data structure level, of unity, the hash tree then branches into a plurality of hash table nodes 66, 68, 70 at depth 2, herein designated $DB^1_2$, $DB^2_2$, ... $DB^m_2$, each of which hash table nodes 66, 68, 70 contains one or more so-called "buckets". Each bucket in one of the hash table nodes 66, 68, 70 points to a node at depth 3, e.g., one of the nodes 72, 74 designated $DB^{11}_3$, $DB^{12}_3$, and this branching to further hash table nodes to a depth "d" continues. Eventually, when the number of itemsets in a particular branch may be stored in a single bucket, the node becomes a so-called "leaf node". e.g, one of the leaf nodes 76, 78, which directly stores part of the transaction data.

To add an itemset c to the hash tree shown in FIG. 5, a hash function is applied to the $d^{th}$ item of the itemset c to thereby generate a path to follow down the hash tree. Initially, all nodes are created as leaf nodes, and when the number of itemsets stored in a leaf node exceeds a predetermined number, the leaf node is converted to a hash table node which points to a subordinate leaf node (or hash table node) in which further data may be stored.

With the above in mind, FIG. 6 shows how the counting steps in FIG. 3 are accomplished. Starting at the root node at circle 80, the mining kernel 16 embodied by the system 10 applies the hash function (also referred to as "hashes on") every item "i" in the transaction "t" under test. At block 81, the mining kernel 16 embodied by the system 10 accesses the bucket corresponding to the item "i", and then moving to decision block 82, it is determined whether the process is examining a leaf node. If so, at block 84 the mining kernel 16 embodied by the system 10 identifies which itemsets in the leaf node are contained in the transaction "t" and then adds a reference to those itemsets to the answer set, formatted in the preferred embodiment as a bitmap. Otherwise, at block 86 the mining kernel 16 embodied by the system 10 applies the hash function to every itemset following the itemset "i" under test at block 86 and recursively applies the procedure to the node.

FIG. 7 shows the preferred method by which the present invention undertakes data buffer management. Starting at decision block 88, the mining kernel 16 embodied by the system 10 determines whether the set $L_{k-1}$ of actual large itemsets fits into buffer memory. If it does, the mining kernel 16 embodied by the system 10 tests at decision block 90 whether the set $C_k$ of candidate large itemsets fits into buffer memory. If it does, buffer size is not limited and the mining kernel 16 embodied by the system 10 exits the process shown in FIG. 7.

On the other hand, if at decision block 90, the system determined that the set $C_k$ of candidate large itemsets does not fit into buffer memory, the mining kernel 16 embodied by the system 10 generates as many candidates "c" in the set $C_k$ of candidate large itemsets that will fit into memory at block 92. Then, a pass is made over the data at block 94 to count the support for the set $C_k$ of candidate large itemsets, and the resulting set $L_k$ of actual large itemsets is written to disk at block 96, with the small candidate large itemsets "c" being deleted. At decision block 98, the mining kernel 16 embodied by the system 10 determines whether all candidate large itemsets "c" in the set $C_k$ of candidate large itemsets have been counted, and if so, exits FIG. 7. Otherwise, the mining kernel 16 embodied by the system 10 loops back to block 92.

If it is determined at decision block 88 that the set $L_{k-1}$ of actual large itemsets fails to fit into buffer memory, the mining kernel 16 embodied by the system 10 moves to block 100 to externally son the set $L_{k-1}$ of actual large itemsets and bring into buffer memory subitemsets of the set $L_{k-1}$ in which the first k-2 items are the same. At block 102, candidate large itemsets "c" (i.e., the set $C_k$ of candidate large itemsets) are generated using these blocks of the set $L_{k-1}$ in accordance with the principles described above, until it is determined at decision block 104 that buffer memory has become full. If so, a pass is made over the database at block 106 to count the set $C_k$ of candidate large itemsets. The mining kernel 16 embodied by the system 10 then loops back to block 102.

Figure 8:
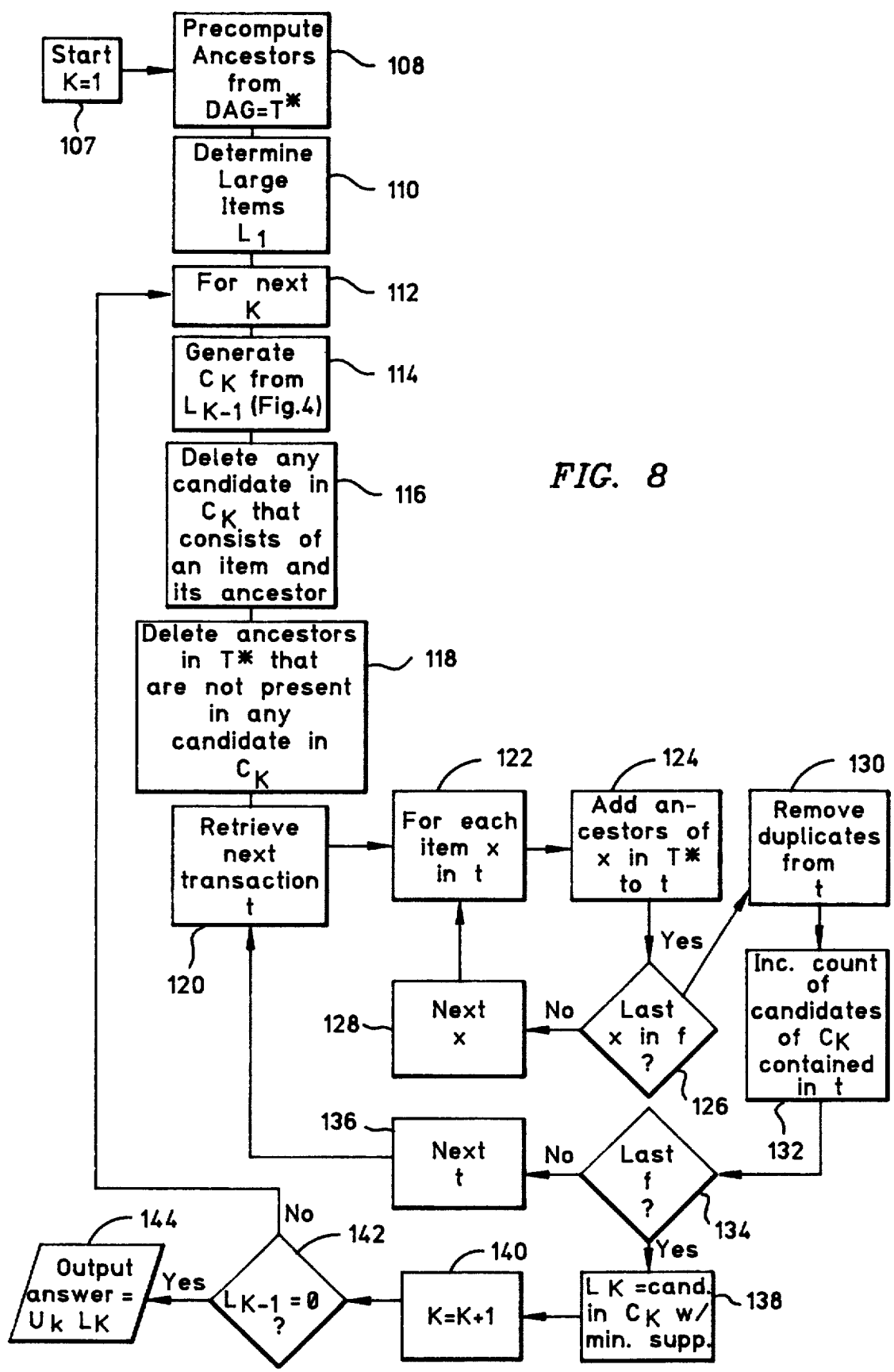
FIG. 8 is a flow chart showing the operation of the Cumulate embodiment of the present invention in identifying large itemsets.

Turning now to FIG. 8, the operation and processing structure of the Cumulate embodiment of the present invention in determining large itemsets in a taxonomy can be seen. At block 107, the process starts with k=1. Block 108 next shows a first optimization wherein ancestors for each item in the taxonomy (designated T) are precomputed and added to a set T* of precomputed ancestors, in lieu of finding ancestors for each item on the fly by traversing the taxonomy T multiple times. The set $L_1$ of large items is determined at block 110, and then an iteration for each k≦2 is commenced at block 112.

At block 114, $C_k$ is generated from $L_{k-1}$ using the steps of FIG. 4. Block 116 represents a second optimization, wherein all candidate itemsets in the set $C_k$ of candidate large itemsets which contains both an item and the ancestor of the item is deleted from $C_k$.

Block 118 represents yet a third optimization, wherein all ancestors in the set T* of precomputed ancestors that are not present in any candidate in the set $C_k$ of candidate large itemsets are deleted. From block 118, the kernel 16 of the system 10 proceeds to block 120, wherein the next transaction "t" in the database 20 is retrieved. At block 122, the next item "x" in the transaction "t" under test is retrieved., and at block 124 ancestors of the item "x" under test which are present in the set T* of precomputed ancestors are added to the transaction "t" under test.

Moving to decision block 126, it is determined whether the last element "x" in the transaction "t" under test has been tested, and if not, the process proceeds to block 128 to retrieve the next item "x" in the transaction "t" under test and from thence to block 122. Otherwise, the process proceeds to block 130, wherein duplicate entries are removed from the transaction "t" under test, and proceeding to block 132 the count of any candidate that is in the set $C_k$ of candidate large itemsets and that is also present in the transaction "t" under test is incremented by one. Next, at decision block 134, it is determined whether the last transaction "t" in the database has been tested, and if not, the process proceeds to block 136 to retrieve the next transaction and from thence to block 120.

If the last transaction has been tested, the process moves to block 138 to establish a set $L_k$ of actual large items to be equal to the candidates in the set $C_k$ of candidate large itemsets that have at least minimum support. At block 140, k is set equal to k+1, and at decision block 142 it is determined whether $L_{k-1}$ is null. If not, the process loops back to block 112. Otherwise, the process outputs the set of all large itemsets, which is equal to LJ k $L_k$, at output block 144.

Figure 9:
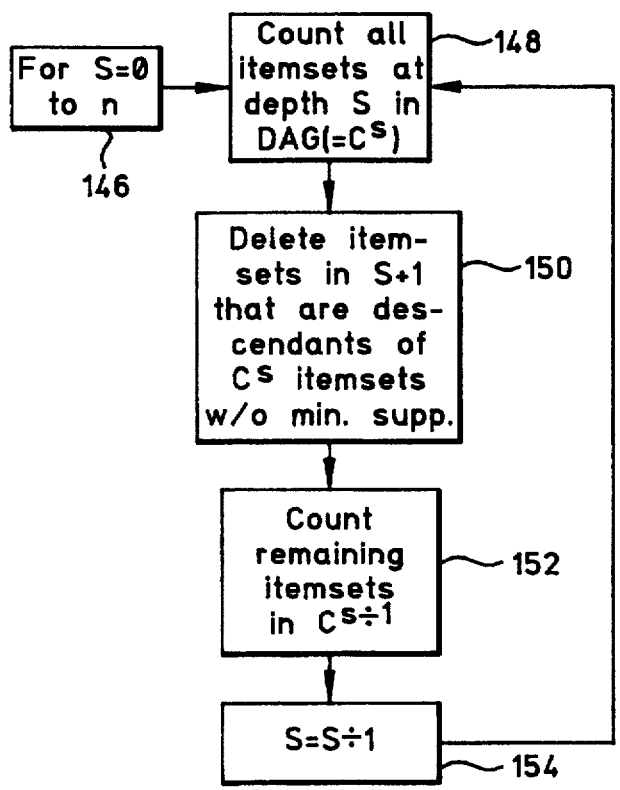
FIG. 9 is a flow chart showing the operation of the Stratify embodiment of the present invention in identifying large itemsets.
Figure 10:
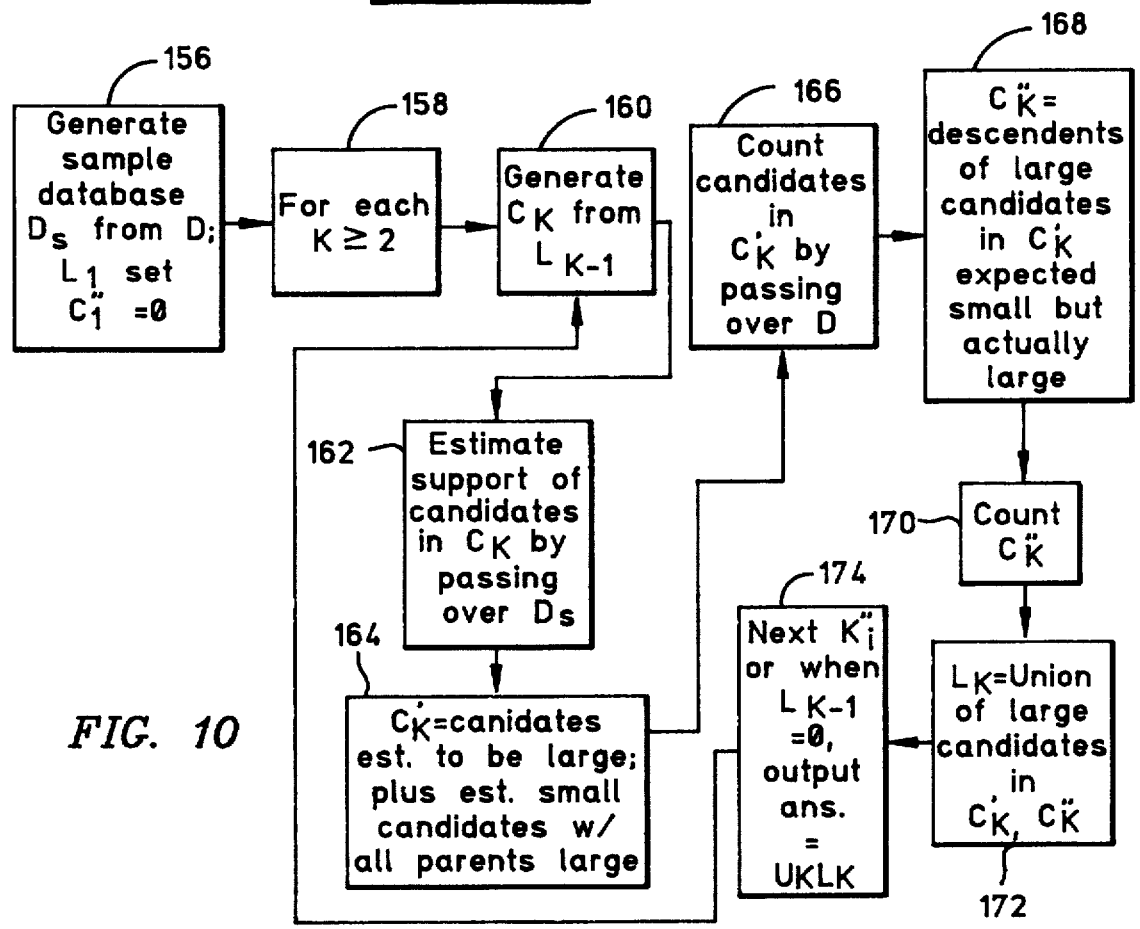
FIG. 10 is a flow chart showing the operation of the Estimate embodiment of the present invention in identifying large itemsets.
Figure 11:
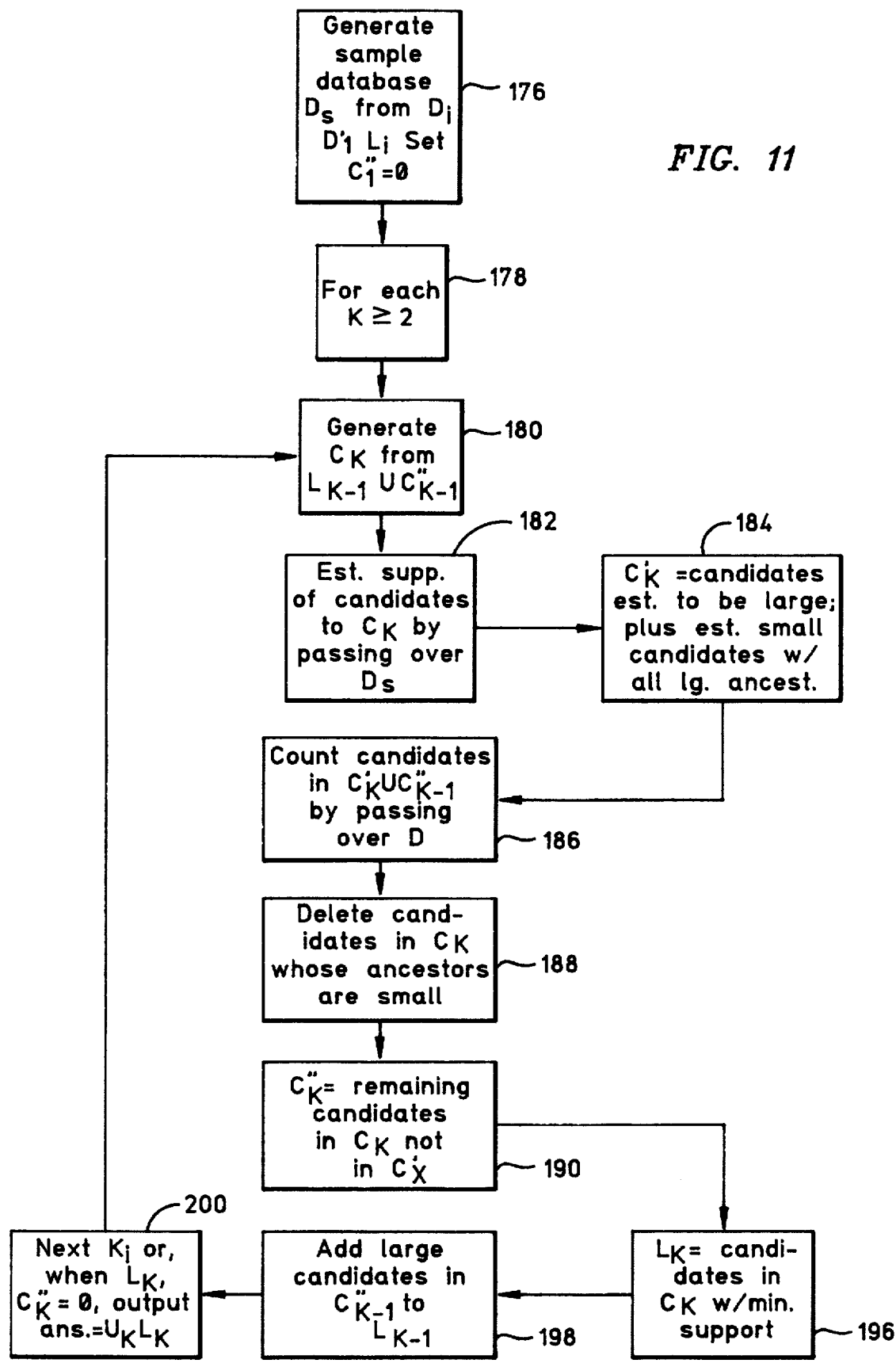
FIG. 11 is a flow chart showing the operation of the EstMerge embodiment of the present invention in identifying large itemsets.

FIGS. 9–11 show alternative methods for determining large itemsets which take advantage of the taxonomy on the items in the database 20. It is to be understood that the first, second, and third optimizations shown in FIG. 8 can be applied to the alternative methods for determining large itemsets shown in FIGS. 9–11.

Starting at block 146 of the generalized "stratify" method shown in FIG. 9, for each level "s" of the taxonomy from the highest (i.e., 0) level to the lowest level "n" of the taxonomy, the kernel 16 of the system 10 proceeds to block 148, wherein all itemsets containing items at the depth "s" under test are counted and entered into a depth set $C^s$. At block 150, all itemsets containing items in the next lowest depth "s+1" that are descendants of small itemsets in $C^s$ are deleted, and the remaining itemsets are entered into a next lowest depth set $C^{s+1}$ and counted at block 152. From block 152, the kernel 16 of the system 10 retrieves the next "s" at block 154, and then loops back to block 148. Itemsets found to be large are output as the set of all large itemsets, which is equal to $\cap_k L_k$.

FIG. 10 shows a method, termed herein "estimate", tier determining large itemsets in which likely large itemsets are first estimated by counting a fraction of the total database prior to confirming that the estimated large itemsets actually are large. Starting at block 156, a sample database $D_s$ is generated from the database 20 (referred to as "D" in FIG. 10). The sample database $D_s$ is generated by selecting at random a predetermined percentage of the database 20, which percentage decreases with increasing minimum support and increasing database 20 size. In one embodiment, the sample database $D_s$ is 1% of the entries in the database 20. A set $L_1$ of large items is also determined at block 156 using methods previously described, and a set $C_1"$ of descendant candidate large itemsets is set to null.

Block 158 shows that tier each k≦2, the kernel 16 of the system 10 proceeds to block 160 to generate a set $C_k$ of candidate large itemsets from the concatenation of the immediately preceding set $L_{k-1}$ of actual large itemsets, in accordance with principles previously disclosed.

Proceeding to block 162, the support of candidates in the set $C_k$ of candidate large itemsets is estimated by passing over the sample database $D_s$ and counting the support of the candidates in accordance with principles previously disclosed. Next, at block 164, a set $C_k'$ of estimated large itemsets is generated which includes the candidates estimated to be large at block 162. In addition, the set $C_k'$ of estimated large itemsets includes candidates which were estimated to be small at block 162 but all ancestors of which are large. In one embodiment, a candidate is regarded as being "large" if it is estimated to have a support equal to at least 0.9 times the minimum support value.

Moving to block 166, the kernel 16 of the system 10 counts the support of candidates in the set $C_k'$ estimated large itemsets by passing over the full database 20. Then, at block 168, a set $C_k"$ of descendant candidate large itemsets is defined to be descendants of candidates in the set $C_k'$ of estimated large itemsets that were expected to be not large, i.e., "small", but which were found to actually be large at block 166. Next, at block 170 the itemsets in the set $C_k"$ of descendant candidate large itemsets are counted to determine which actually are large.

At block 172, a set $L_k$ of actual large itemsets is defined to be the union of candidates found to be large in the set $C_k'$ of estimated large itemsets and the set $C_k"$ of descendant candidate large itemsets. From block 172, the method proceeds to block 174 to retrieve the next k and return to block 160. If, at block 174, the immediately preceding set $L_{k-1}$ of actual large itemsets is null, the method outputs the answer as the set of all large itemsets, which is equal to $\cap_k L_k$.

FIG. 11 shows yet another method, termed herein "est-merge", for determining large itemsets in a data structure containing items with an imposed taxonomy. Starting at block 176, a sample database D, is generated from the database 20 (referred to as "D" in FIG. 11) in accordance with principles discussed above. A set $L_1$ of large items is also determined at block 176 using methods previously described, and a set $C_1"$ of descendant candidate large itemsets is set to null.

Block 178 shows that for each k≦2, the kernel 16 of the system 10 proceeds to block 180 to generate a set $C_k$ of candidate large itemsets from the concatenation of the immediately preceding set $L_{k-1}$ of actual large itemsets and the immediately preceding set $C_{k-1}"$ of descendant candidate large itemsets, in accordance with principles previously disclosed.

Proceeding to block 182, the support of candidates in the set $C_k$ of candidate large itemsets is estimated by passing over the sample database $D_s$ and counting the support of the candidates in accordance with principles previously disclosed. Next, at block 184, a set $C_k'$ of estimated large itemsets is generated which includes the candidates estimated to be large at block 182. In addition, the set $C_k'$ of estimated large itemsets includes candidates which were estimated to be small at block 182 but the ancestors of which are all large.

Moving to block 186, the kernel 16 of the system 10 counts the support of candidates in union of the set $C_k'$ of estimated large itemsets and the immediately preceding set $C_{k-1}"$ of descendant candidate large itemsets by passing over the full database 20. At block 188, all candidates in the set $C_k$ of candidate large itemsets whose ancestors in the set $C_k'$ of estimated large itemsets were found to be small at block 186 are deleted from $C_k$.

From block 188, the method proceeds to block 190, wherein a set $C_k"$ of descendant candidate large itemsets is

15 defined to be those candidates remaining in the set $C_k$ of candidate large itemsets which are not in the set $C_k'$ of estimated large itemsets. Then, the method moves to block 196. At block 196, the method of the present invention defines a set $L_k$ of actual large itemsets to be equal to those itemsets in the set $C_k$ of candidate large itemsets that were found to be large, and at block 198 itemset candidates in the set $C_k''$ of descendant candidate large itemsets found to be actually large at block 194 are added to the set $L_k$ of actual large itemsets.

From block 198, the method proceeds to block 200 to retrieve the next k and return to block 180. If at block 200, the immediately preceding set $L_k$ of actual large itemsets and the set $C_k''$ of descendant candidate large itemsets are null, the method outputs the answer as the set of all large itemsets, which is equal to $U_k L_k$.

Turning now to FIG. 12, one embodiment of the association rule discoverer of the present invention is shown. It is to be understood that FIG. 12 is entered by the mining kernel 16 after all large itemsets in the database 20 have been identified using one of the large itemset generators disclosed above. Stated differently, FIG. 12 is entered with all itemsets found by the large itemset generator to have a support value in the database 20 which exceeds the user-defined minimum support value.

As indicated at block 202, the mining kernel 16 undertakes the operations shown in FIG. 12 for each large itemset $1_k$, $k \leq 2$, and proceeds to block 204, wherein the mining kernel 16 selects the next non-empty subset $a_m$ of the large itemset $1_k$ under test. At block 206, for the subset $a_m$ under test, the mining kernel 16 calculates a confidence value to be the support of the large itemset $1_k$ under test divided by the support of the subset $a_m$ under test. Then, at decision block 208, the mining kernel 16 compares the confidence value of the subset $a_m$ to a user-defined minimum confidence value, and if the confidence value of the subset $a_m$ is not at least equal to the user-defined minimum confidence value, the mining kernel 16 loops back to block 136 to retrieve the next subset $a_{m+1}$ of the large itemset $1_k$ under test.

On the other hand, if, at decision block 208, the mining kernel 16 determines that the confidence value of the subset $a_m$ is at least equal to the user-defined minimum confidence value, the mining kernel 16 proceeds to output block 210 to output an association rule of the form $$a_m \Rightarrow (1_k - a_m)$$

with "confidence=[calculated confidence value], "support= [support of $1_k$], and the term on the right side of the implication arrow is referred to as the "consequent" of the rule. From output block 210, the mining kernel 16 loops back to block 204 to retrieve the next subset $a_{m+1}$ of the large itemset $1_k$ under test.

FIGS. 13 and 14 show a faster embodiment for discovering association rules. As indicated at block 212, the mining kernel 16 undertakes the operations shown in FIG. 13 for each large itemset $1_k$. and proceeds to block 214, wherein the mining kernel 16 sets an initial consequent set $H_1$=all one item consequents of association rules derived essentially using the embodiment shown in FIG. 10. FIG. 10 is called at block 216 to determine association rules having more than a one item consequent, and then the value of m is incremented by one at block 218. At block 220, it is determined whether k is greater than the new value of m, and if it is, the mining kernel 16 loops back to block 216. Otherwise, the mining kernel 16 loops back to block 212 to retrieve the next large itemset.

16

Now referring to FIG. 14, the details of the faster embodiment for discovering association rules can be seen. Beginning at block 224, a next consequent set $H_{m+1}$ is generated from the consequent set $H_m$ using the invention shown in FIG. 4, with the consequent set $H_m$ as the entering argument. Proceeding to block 226, for each element $h_{m+1}$ the next consequent set $H_{m+1}$ under test, the mining kernel 16 calculates a confidence value to be the support of the large itemset $1_k$ under test divided by the support of the subset $(1_k - h_{m+1})$. Then, at decision block 228, the mining kernel 16 compares the confidence value determined at block 226 to a user-defined minimum confidence value, and if the confidence value is not at least equal to the user-defined minimum confidence value, the mining kernel 16 deletes the element $h_{m+1}$ from the next consequent set $H_{m+1}$ at block 230.

On the other hand, if, at decision block 228, the mining kernel 16 determines that the confidence value determined at block 226 is at least equal to the user-defined minimum confidence value, the mining kernel 16 proceeds to output block 232 to output an association rule of the form $$(1_k - h_{m+1}) \Rightarrow h_{+1}$$

with "confidence=[calculated confidence value], "support= [support of $1_k$]. From either output block 232 or block 230, the mining kernel 16 loops back to block 226 to retrieve the next element $h_{m+1}$ from the next consequent set $H_{m+1}$.

Figure 15:
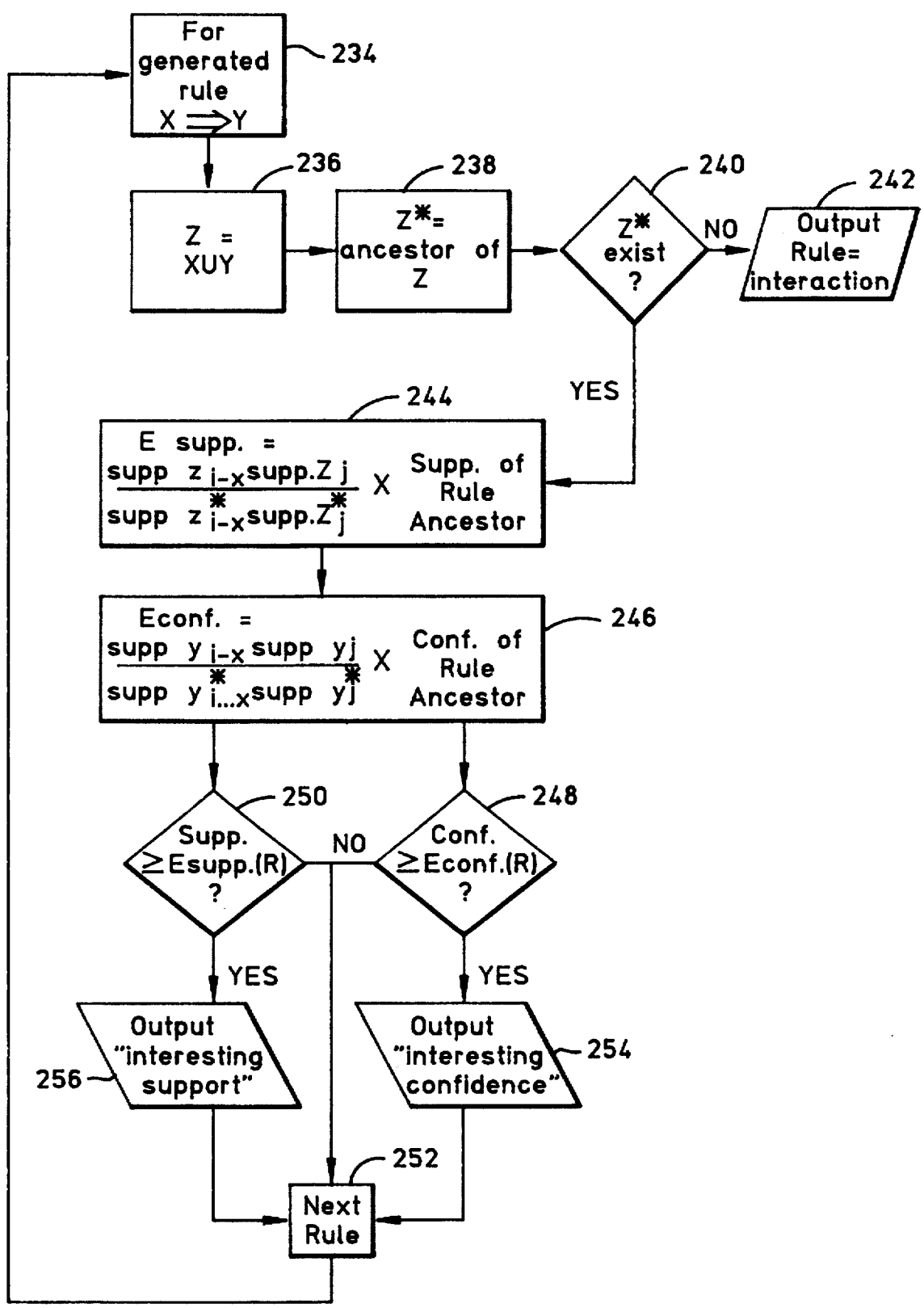
FIG. 15 is a flow chart showing the method by which non-interesting association rules are pruned.

FIG. 15 shows the rule pruner of the present invention for identifying an association rule as interesting, based upon the support and confidence of the rule vis-a-vis the support and confidence of an ancestor, if any, of the rule. Starting at block 234, an association rule between a predicate set X and a consequent set Y, as determined from the rule generator 38 in FIG. 2, is selected. Proceeding to block 236, a test set $Z=\{z_1 \ldots z_n\}$ is defined to be the union of the predicate set X and consequent set Y.

Next, at block 238, an ancestor test set $Z^*$ is identified, if possible, wherein $Z^*=\{z^*_1 \ldots z^*_j \ldots z^*_n\}$, $1 \geq j \geq n$, where $z^*_i$ is an ancestor of $z^*_i$. At decision block 240 it is determined whether an ancestor test set $Z^*$ has been identified, and if not the method proceeds to output block 242 to identify the rule as being interesting. On the other hand, if, at decision block 240, it is determined that an ancestor test set $Z^*$ has been identified, the method moves to block 244.

Block 244 determines an expected support $E_{supp}$ for the rule under test. To determine the expected support $E_{supp}$, block 244 determines the product of the supports for each element in the test set Z and divides the product by the product of the supports for each element in the ancestor test set $Z^*$. The resulting quotient is multiplied by the support of the ancestor test set $Z^*$ to yield the expected support $E_{supp}$ of the rule under test.

Similarly, block 246 determines an expected confidence $E_{conf}$ for the rule under test. To determine the expected confidence $E_{conf}$, block 246 determines the product of the supports for each element in the consequent set Y and divides the product by the product of the supports for each element in an ancestor consequent set $Y^*$. wherein $Y=\{y_1 \ldots Y_n\}$ and $Y^*=\{y^*_1 \ldots y^*_j \ldots y^*_n\}$, $1 \leq j \leq n$, and wherein $y^*_i$ is an ancestor of $y_i$. The resulting quotient is multiplied by the confidence of the ancestor test set $Z^*$ to yield the expected confidence $E_{conf}$ of the rule under test.

From block 246, the method proceeds in parallel to decision blocks 248, 250 to respectively determine whether the actual confidence and support of the rule under test exceeds the expected confidence $E_{conf}$ times a user-defined factor "R" and the expected support $E_{supp}$ times the user-defined factor "R". In one embodiment, "R"=1.1.

If the test at decision block 248 is positive, the method moves to output block 254 to output the rule as having interesting confidence. Likewise, if the test at decision block 250 is positive, the method moves to output block 256 to output the rule as having interesting support. From another aspect, the method prunes the rule under test from the output of the system 10 if the rule has neither interesting confidence or interesting support. From output blocks 254, 256, or decision blocks 248, 250 if the tests there were negative, the method moves to block 252 to retrieve the next generalized association rule and then loop back to block 234.

While the particular system and method for mining association rules in databases as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer program device comprising:

a computer program storage device readable by a digital processing apparatus; and a program means on the program storage device and including instructions executable by the digital processing apparatus for performing method steps for identifying association rules in itemsets with a hierarchical taxonomy on items of the itemsets, the taxonomy defining descendant and ancestor relationships between the items, the method steps comprising:

entering an itemset into a set of large itemsets when the number of times the itemset is present in a database of transactions establishes a support value that exceeds a predefined minimum support value;

for at least some of the itemsets in the set of large itemsets, determining the number of times selected subsets of the itemsets appear in transactions in the database; and (d) outputting an association rule when the number of times a selected subset appears in the database bears a predetermined relationship to the number of times the associated itemset appears in the database and thereby satisfies a minimum confidence constraint.

2. The computer program device of claim 1, further comprising the steps of:

concatenating itemsets in the set of large itemsets in accordance with a predetermined concatenation regime to generate a next set of candidate large itemsets and discarding all candidate large itemsets whose subsets are not large itemsets;

comparing each itemset in the next set of candidate large itemsets to the itemsets in the database to determine the number of times the candidate large itemset is present in the database: and entering a candidate large itemset into a next forward set of large itemsets only when the number of times the candidate large itemset is present in the database is greater than the minimum support value.

3. The computer program device of claim 2, wherein the taxonomy is a directed acyclic graph (DAG) taxonomy, and at least some of the itemsets contain items that are descendant items and ancestor items in the DAG taxonomy.

4. The computer program device of claim 3, wherein ancestors of an item are entered into transactions that include the item only when the ancestor appears in one of the itemsets in the next set of candidate large itemsets, and the method further comprises the steps of:

accessing the DAG taxonomy to predetermine the ancestors of each item prior to entering the ancestors into the set of large itemsets; and when an itemset in the next set of candidate large itemsets contains an item and an ancestor of the item deleting the itemset from the next set of candidate large itemsets.

5. The computer program device of claim 4, further comprising the steps of entering ancestors of an item into transactions that include the item and deleting duplicate item entries from the transactions, prior to determining the number of times the associated itemset is present in the database.

6. The computer program device of claim 4, wherein the taxonomy is derived on the itemsets and is characterized by a hierarchical order of levels, the levels ranging from highest level to lowest level successively represented by integers 0 through n, and itemsets containing items at level 0 are accessed for entry into the set of large itemsets before itemsets containing items at other levels.

7. The computer program device of claim 6, wherein an itemset at level 1 is deleted if the itemset is a descendant of an ancestor itemset in level 0 when the number of times the ancestor itemset is present in the database does not exceed the predefined minimum support value, the deleting step being performed before itemsets at level 1 are accessed for entry into the set of large itemsets.

8. The computer program device of claim 4, wherein the taxonomy is characterized by a hierarchical order of levels, the levels ranging from highest level to lowest level successively represented by integers 0 through n, the method further comprising the steps of:

accessing a selected sample portion of the database to estimate candidate large itemsets;

entering itemsets estimated to be large into the next set of candidate large itemsets: and entering itemsets not estimated to be large but having ancestor itemsets all of which are estimated to be large into the next set of candidate large itemsets.

9. The computer program device of claim 8, further comprising the step of determining the number of times descendant itemsets of an itemset that was not estimated to be large are present in the database when the next set of candidate large itemsets is counted.

10. The computer program storage device of claim 1, further comprising the steps of:

determining expected confidence and support values for an association rule based upon the confidence and support of an ancestor of the association rule; and identifying the association rule as interesting when the confidence and support values of the association rule exceeds the expected confidence and support values by a predetermined factor.

11. A computer program product for use with a computer system, a central processing unit and means coupled to the central processing unit for storing a database to identify association rules in itemsets of transactions which are stored in the database, the itemsets being characterized by items in a hierarchical taxonomy, comprising:

a data storage device including a computer usable medium having computer readable program means for identifying association rules in itemsets having items anywhere in the hierarchy of the taxonomy, the computer usable code means having:

computer readable code means for accessing an itemset;

computer readable code means for entering the itemset into a set of large itemsets when the number of times the itemset is present in the database exceeds a predefined minimum support value;

computer readable code means for determining for at least some of the itemsets in the set of large itemsets, the number of times selected subsets of the itemsets appear in transactions in the database; and computer readable code means for outputting an association rule when the number of times a selected subset appears in the database bears a predetermined minimum confidence relationship to the number of times the associated itemset appears in the database, thereby satisfying a minimum confidence constraint.

12. The computer program product of claim 11, wherein the taxonomy is a directed acyclic graph (DAG) taxonomy, and at least some of the itemsets contain items that are descendant items or ancestor items in the DAG taxonomy.

13. The computer program product of claim 12, wherein ancestors of an item are entered into transactions that include the item only when the ancestor appears in one of the itemsets in the next set of candidate large itemsets, and the computer program product further comprises:

computer readable code means for accessing the DAG taxonomy to predetermine the ancestors of each item prior to entering the ancestors into the set of large itemsets; and computer readable code means for deleting, when an itemset in the next set of candidate large itemsets contains an item and an ancestor of the item, the itemset from the next set of candidate large itemsets.

14. The computer program product of claim 13, further comprising computer readable code means for entering ancestors of an item into a transaction that includes the item and deleting duplicate item entries from the transaction, prior to determining the number of times the associated itemset is present in the database.

15. The computer program product of claim 13, wherein the taxonomy derived on the candidate itemsets is characterized by a hierarchical order of levels, the levels ranging from highest level to lowest level successively represented by integers 0 through n, and the computer readable code means accesses itemsets at level 0 for entry into the set of large itemsets before itemsets at other levels are accessed.

16. The computer program product of claim 15, wherein the computer readable code means deletes an itemset at level 1 if the itemset is a descendant of an ancestor itemset in level 0. When the number of times the ancestor itemset is present in the database does not exceed the predefined minimum support value, before itemsets at level 1 are accessed for entry into the set of large itemsets.

17. The computer program product of claim 13, wherein the taxonomy is characterized by a hierarchical order of levels, the levels ranging from highest level to lowest level successively represented by integers 0 through n, and the computer program product further comprises:

computer readable code means for accessing a selected sample portion of the database to estimate candidate large itemsets;

computer readable code means for entering itemsets estimated to be large into the next set of candidate large itemsets; and computer readable code means for entering itemsets not estimated to be large but having all ancestor itemsets estimated to be large into the next set of candidate large itemsets.

18. The computer program product of claim 17, further comprising computer readable code means for determining the number of times descendant itemsets of an itemset that was not estimated to be large are present in the database when the next set of candidate large itemsets is counted.

19. The computer program storage device of claim 11, further comprising:

computer readable code means for determining expected confidence and support values for an association rule based upon the confidence and support of an ancestor of the association rule; and computer readable code means for identifying the association rule as interesting when the confidence and support values of the association rule exceeds the expected confidence and support values by a predetermined factor.

20. A program storage device readable by a digital processing apparatus and tangibly embodying a program of instructions executable by the digital processing apparatus to perform method steps for identifying generalized association rules of itemsets in transactions stored in a database and having more than one item, the items being characterized by a taxonomic structure, so as to discover customer purchasing tendencies, the method steps comprising:

identifying as large itemsets those itemsets having items located anywhere in the taxonomic structure and recurring with at least a user-defined minimum support;

discovering association rules between the large itemsets and subsets thereof when the subset recurrence bears a predetermined relationship to itemset recurrence; and outputting the association rules as representative of customer purchasing tendencies.

21. The program storage device of claim 20, comprising the step of generating a next set of candidate large itemsets, wherein ancestors of an item are entered into at least one transaction that includes the item only when the ancestor appears in one of the itemsets in the next set of candidate large itemsets, and the method steps further comprise:

accessing the taxonomic structure to predetermine ancestors of each item prior to entering the ancestors into the set of large itemsets; and when an itemset in the next set of candidate large itemsets contains an item and an ancestor of the item, deleting the itemset from the next set of candidate large itemsets.

22. The program storage device of claim 21, further comprising the steps of:

determining expected confidence and support values for an association rule based upon the confidence and support of an ancestor of the association rule; and identifying the association rule as interesting when the confidence and support values of the association rule exceeds the expected confidence and support values by a predetermined factor.

23. A database mining system for discovering association rules in itemsets having items stored in a taxonomically structured database, comprising:

a large itemset generator for generating large itemsets when the itemsets have a support in a transaction database at least equal to a user-defined minimum support value;

an association rule generator for receiving the large itemsets and outputting an association rule when an itemset bears a confidence relationship to at least one of its subsets equal to or greater than a predetermined confidence relationship; and a rule pruner for identifying an association rule as interesting when the support and the confidence relationship respectively exceed an expected support and an expected confidence relationship by a preselected factor.

24. A computer-based system for discovering purchasing tendencies of consumers by identifying association rules between itemsets of transactions and subsets of the itemsets, the subsets including one or more items, comprising:

a multi-level taxonomic structure accessible by the computer for storing the items in a hierarchical relationship;

a large itemset generator accessing the taxonomic structure and the transactions for determining a first number of times an itemset appears in the transactions and for designating the itemset as a large itemset when the first number of times exceeds a minimum support value; and an association rule discoverer accessing the large itemset generator for determining a second number of times at least one subset of an itemset appears in the transactions, the association rule discoverer outputting an association rule representative of purchasing tendencies of consumers when the first number of times bears a predetermined minimum confidence relationship to the second number of times.

\* \* \* \* \*

UNITED STATES PATENT AND TRADEMARK OFFICE
CERTIFICATE OF CORRECTION

PATENT NO.   : 5,615,341
DATED        : March 25, 1997
INVENTOR(S)  : Agrawal et al It is certified that error appears in the above-indentified patent and that said Letters Patent is hereby corrected as shown below:

Column 17, line 41, delete "(d)".

Signed and Sealed this

Eighth Day of July, 1997

Attest:

BRUCE LEHMAN

Attesting Officer        Commissioner of Patents and Trademarks